US012802590B2

(12) United States Patent
Takemura

(10) Patent No.: US 12,802,590 B2
(45) Date of Patent: Nov. 17, 2026

(54) VASCULAR MODEL

(71) Applicant: ASAHI INTECC CO., LTD., Seto (JP)

(72) Inventor: Kazu Takemura, Seto (JP)

(73) Assignee: ASAHI INTECC CO., LTD., Nagoya (JP)

( * ) Notice: Subject to any disclaimer, the term of this patent is extended or adjusted under 35 U.S.C. 154(b) by 527 days.

(21) Appl. No.: 18/240,794

(22) Filed: Aug. 31, 2023

(65) Prior Publication Data

US 2023/0410690 A1 Dec. 21, 2023

Related U.S. Application Data

(63) Continuation of application No. PCT/JP2021/011873, filed on Mar. 23, 2021.

(51) Int. Cl.
*G09B 23/30* (2006.01)

(52) U.S. Cl.
CPC .................................. *G09B 23/303* (2013.01)

(58) Field of Classification Search
CPC .................................................... G09B 23/303
See application file for complete search history.

(56) References Cited

U.S. PATENT DOCUMENTS

2012/0035434 A1* 2/2012 Ferren .................. A61B 5/4839 600/301
2019/0355280 A1 11/2019 Champ et al.

FOREIGN PATENT DOCUMENTS

| | | | |
|---|---|---|---|
| JP | 2004-275682 | A | 10/2004 |
| JP | 2008-161220 | A | 7/2008 |
| JP | 2010-017324 | A | 1/2010 |
| JP | 2010-049071 | A | 3/2010 |
| JP | 2017-053897 | A | 3/2017 |
| JP | 2017-146415 | A | 8/2017 |

* cited by examiner

*Primary Examiner* — Kesha Frisby
(74) *Attorney, Agent, or Firm* — Oliff PLC

(57) ABSTRACT

A vascular model includes a hollow tubular first tube body, and a hollow tubular second tube body that covers an inner peripheral surface of the first tube body. The first tube body has an acoustic impedance higher than an acoustic impedance of the second tube body.

19 Claims, 10 Drawing Sheets

Fig. 7

| | FIRST TUBE BODY 10,10A | SECOND TUBE BODY 20,20A | THIRD TUBE BODY 30,30A |
|---|---|---|---|
| EXAMPLE 1 | FINE PARTICLE CONCENTRATION A (A≧C>B) | FINE PARTICLE CONCENTRATION B (A≧C>B) | FINE PARTICLE CONCENTRATION C (A≧C>B) |
| EXAMPLE 2 | POLYMER MATERIAL A (EX. PVA) | POLYMER MATERIAL B (EX. SILICON) | POLYMER MATERIAL C (EX. PVA) |
| EXAMPLE 3 | HARDNESS A (A≧C>B) | HARDNESS B (A≧C>B) | HARDNESS C (A≧C>B) |
| EXAMPLE 4 | FINE PARTICLE A (EX. METAL FINE PARTICLE) | FINE PARTICLE B (EX. POLYMER FINE PARTICLE) | FINE PARTICLE C (EX. GLASS FINE PARTICLE) |
| | ACOUSTIC IMPEDANCE A (A≧C>B) | ACOUSTIC IMPEDANCE B (A≧C>B) | ACOUSTIC IMPEDANCE C (A≧C>B) |

VASCULAR MODEL

CROSS-REFERENCE TO RELATED APPLICATION

This is a Continuation of PCT/JP2021/011873 filed Mar. 23, 2021. The disclosure of the prior application is hereby incorporated by reference herein in its entirety.

TECHNICAL FIELD

The disclosed embodiments relate to a vascular model.

BACKGROUND

Medical devices such as catheters are used for minimally invasive treatment or examination inside blood vessels. For example, Patent Literatures 1 to 4 disclose biological models and simulating blood vessels that allow an operator such as a surgeon to simulate a procedure using these medical devices.

CITATION LIST

Patent Literature

Patent Literature 1: JP 2017-146415 A
Patent Literature 2: JP 2017-53897 A
Patent Literature 3: JP 2010-49071 A
Patent Literature 4: JP 2004-275682 A

SUMMARY

Technical Problem

In a procedure using a medical device, a blood vessel image (hereinafter, also referred to as an "ultrasonic image") is acquired using an ultrasonic image diagnostic device in order to ascertain a curved shape of the blood vessel, a condition inside the blood vessel, and a position of the medical device inside the blood vessel. A vessel wall generally has a three-layer structure of tunica intima, tunica media, and tunica externa from the inside to the outside. When an ultrasonic image of a real human blood vessel is acquired, a tunica intima, a tunica media, and a tunica externa are each visually recognized on the ultrasonic image. However, the techniques described in Patent Literatures 1 and 2 have a problem that, although a blood vessel has layers corresponding to the tunica externa and the tunica media, these layers cannot be recognized on an ultrasonic image. Also, in the techniques described in Patent Literatures 3 and 4, it is not considered that layers corresponding to the tunica externa and the tunica media of the blood vessel are visualized.

The disclosed embodiments have been made to solve at least a part of the above problems, and an object of the disclosed embodiments is to provide a vascular model in which an ultrasonic image acquired by an ultrasonic image diagnostic device mimics a real living body.

Solution to Problem

The disclosed embodiments have been made to solve at least a part of the above problems, and can be implemented as the following aspects.

(1) According to an aspect of the disclosed embodiments, a vascular model is provided. This vascular model includes a hollow tubular first tube body and a hollow tubular second tube body that covers an inner peripheral surface of the first tube body, in which the first tube body has an acoustic impedance higher than that of the second tube body.

According to this configuration, the vascular model includes a first tube body and a second tube body, in which the first tube body has the acoustic impedance higher than that of the second tube body. Thus, in the ultrasonic image acquired by the ultrasonic image diagnostic device, the image of the first tube body can be made more luminous (whiter) than the image of the second tube body. This makes it possible to provide a vascular model in which an ultrasonic image mimics a real living body.

(2) The vascular model according to the above aspect may be configured such that each of the first tube body and the second tube body contains a polymer material, and fine particles having an acoustic impedance higher than that of the polymer material, and a fine particle concentration in the first tube body is higher than that in the second tube body.

According to this configuration, when the fine particle concentration in the first tube body is higher than that in the second tube body, the acoustic impedance of the first tube body can be easily made higher than that of the second tube body.

(3) The vascular model according to the above aspects may be configured such that each of the first tube body and the second tube body contains a polymer material and fine particles having an acoustic impedance higher than that of the polymer material, a type of the fine particles contained in the first tube body differs from that in the second tube body, and the fine particles contained in the first tube body have a hardness higher than that of the fine particles contained in the second tube body.

According to this configuration, when the fine particles contained in the first tube body have a hardness higher than that of the fine particles contained in the second tube body, the acoustic impedance of the first tube body can be easily made higher than that of the second tube body.

(4) The vascular model according to the above aspects may be configured such that both the particle diameters of the fine particles contained in the first tube body and the second tube body are within a range of 0.1 μm or larger and 500 μm or smaller.

According to this configuration, since both the particle diameters of the fine particles in the first tube body and the second tube body are within the range of 0.1 μm or larger and 500 μm or smaller, the fine particles can be easily dispersed in a polymer material solution when preparing the first and second tube bodies.

(5) The vascular model according to the above aspects may be configured such that each of the first tube body and the second tube body is made of the polymer material, and the polymer material constituting the first tube body has an acoustic impedance higher than that of the polymer material constituting the second tube body.

According to this configuration, when the acoustic impedance of the polymer material constituting the first tube body is higher than that in the second tube body, the acoustic impedance of the first tube body can be easily made higher than that of the second tube body.

(6) The vascular model according to the above aspects may be configured such that each of the first tube body and the second tube body is made of the polymer material, and the first tube body has a hardness higher than that of the second tube body.

According to this configuration, when the hardness of the first tube body is higher than that of the second tube body, the acoustic impedance of the first tube body can be easily made higher than that of the second tube body.

(7) The vascular model according to the above aspects may be configured so as to include a hollow tubular third tube body that covers an inner peripheral surface of the second tube body, in which the third tube body has an acoustic impedance lower than or equal to that of the first tube body and higher than that of the second tube body.

According to this configuration, since the vascular model includes the hollow tubular third tube body that covers the inner peripheral surface of the second tube body, the vascular model can have a three-layer structure similar to that of a real human blood vessel. The acoustic impedance of the third tube body is lower than or equal to that of the first tube body and higher than that of the second tube body. Thus, in the ultrasonic image acquired by the ultrasonic image diagnostic device, the image of the third tube body can have a luminance lower (darker) than or equal to that of the image of the first tube body. Furthermore, the image of the third tube body can have a luminance higher (whiter) than that of the image of the second tube body. This makes it possible to provide a vascular model in which an ultrasonic image further mimics a real living body.

The disclosed embodiments can be implemented in various aspects, e.g. a vascular model, an organ model including the vascular model and simulating an organ such as heart, liver, and brain, a human body simulation device including the vascular model and the organ model, and a method for controlling the human body simulation device, or the like.

BRIEF DESCRIPTION OF DRAWINGS

FIG. 7 is a table presenting methods for changing an acoustic impedance, as examples.

DETAILED DESCRIPTION OF EMBODIMENTS

First Embodiment

Figure 1:
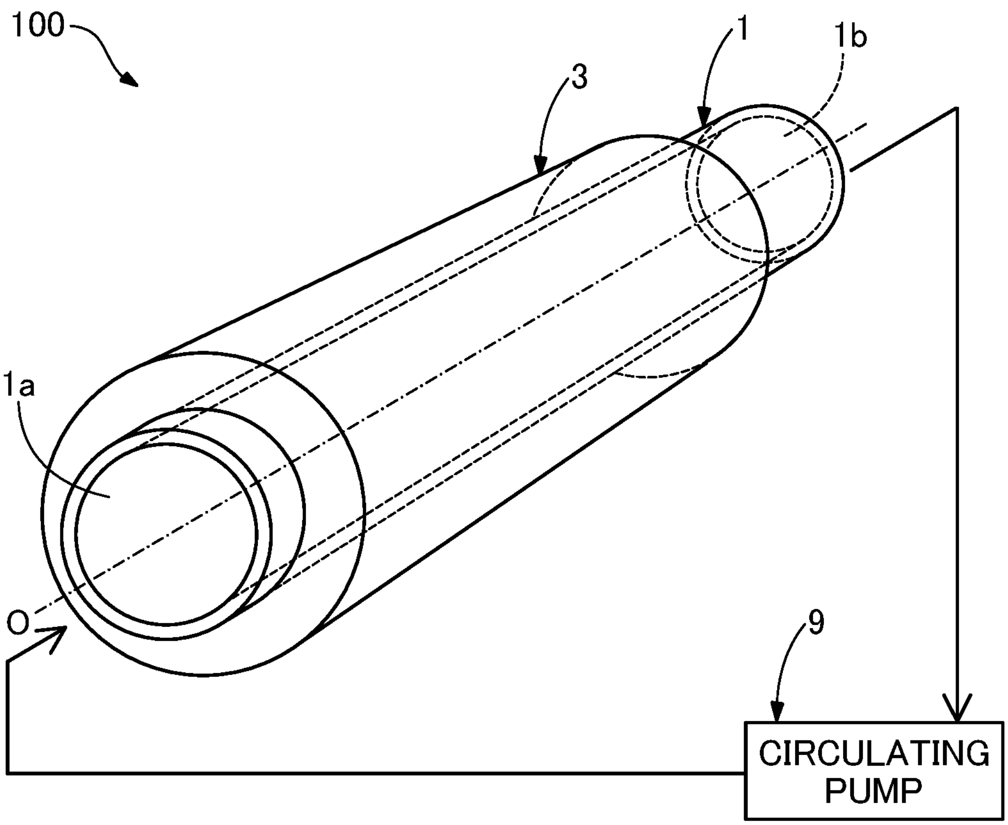
FIG. 1 is an explanatory diagram illustrating a schematic configuration of a vascular simulation device.

FIG. 1 is an explanatory diagram illustrating a schematic configuration of a vascular simulation device 100. The vascular simulation device 100 according to the first embodiment is used for simulating a procedure of treating or examining a blood vessel using a medical device. The medical device may include general devices for minimally invasive treatment or examination, such as catheters, delivery guide wires, and plasma guide wires for excising living body tissues by streamer discharge. The vascular simulation device 100 includes a vascular model 1, an outer tissue model 3, and a circulating pump 9.

In FIG. 1, an axis passing through the centers of the vascular model 1 and the outer tissue model 3 is represented by an axis line O (dot and dash line). In the following figures, both the axis passing through the center of the vascular model 1 and the axis passing through the center of the outer tissue model 3 coincide with the axis line O. However, each of the axes passing through each center of the vascular model 1 and the outer tissue model 3 may be inconsistent with the axis line O. For convenience of explanation, FIG. 1 and the following figures include a portion illustrated in such a way that a relative ratio of sizes of respective components is different from an actual ratio. Furthermore, the figures include a portion where a part of a component is exaggerated.

The vascular model 1 simulates a human blood vessel. The vascular model 1 has an elongated and almost hollow cylindrical shape with openings 1*a* and 1*b* on both ends. Outside the vascular model 1, the outer tissue model 3 simulating human muscle, fat, skin, or the like is placed so as to surround at least a part of the outer peripheral surface of the vascular model 1 (in the illustrated example, a middle part excluding both ends of the vascular model 1). The outer tissue model 3 is made of a soft synthetic resin (e.g. polyvinyl alcohol (PVA), silicone). The circulating pump 9 is e.g. a non-positive displacement type centrifugal pump. The circulating pump 9 is disposed in the middle of the flow passage connecting between the openings 1*a* and 1*b* of the vascular model 1, and circulates a fluid discharged from the opening 1*b* to feed the fluid to the opening 1*a*.

Figure 2:
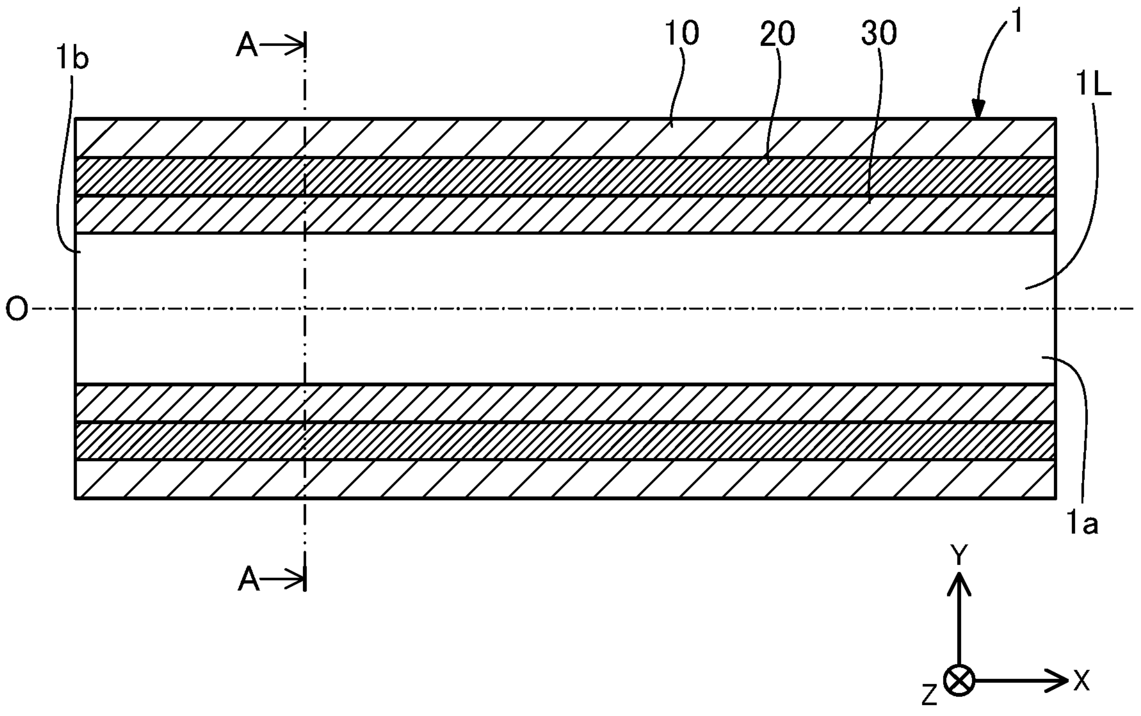
FIG. 2 is an explanatory diagram illustrating a sectional configuration of a vascular model.

FIG. 2 is an explanatory diagram illustrating a sectional configuration of the vascular model 1. FIG. 2 illustrates X-, Y-, and Z-axes orthogonal to each other. The X-axis corresponds to a longitudinal direction of the vascular model 1, the Y-axis corresponds to a height direction of the vascular model 1, and the Z-axis corresponds to a width direction of the vascular model 1. The left side of FIG. 2 (in the −X axis direction) is referred to as a "distal end side" of the vascular model 1. When adopting an antegrade approach, the distal end side is a side far from an insertion site for the medical device (distal, far side). The right side of FIG. 2 (in the +X axis direction) is referred to as a "proximal end side" of the vascular model 1. When adopting an antegrade approach, the proximal end side is a side close to the insertion site for the medical device (proximal, near side). The same applies to the figures following FIG. 2.

Figure 3:
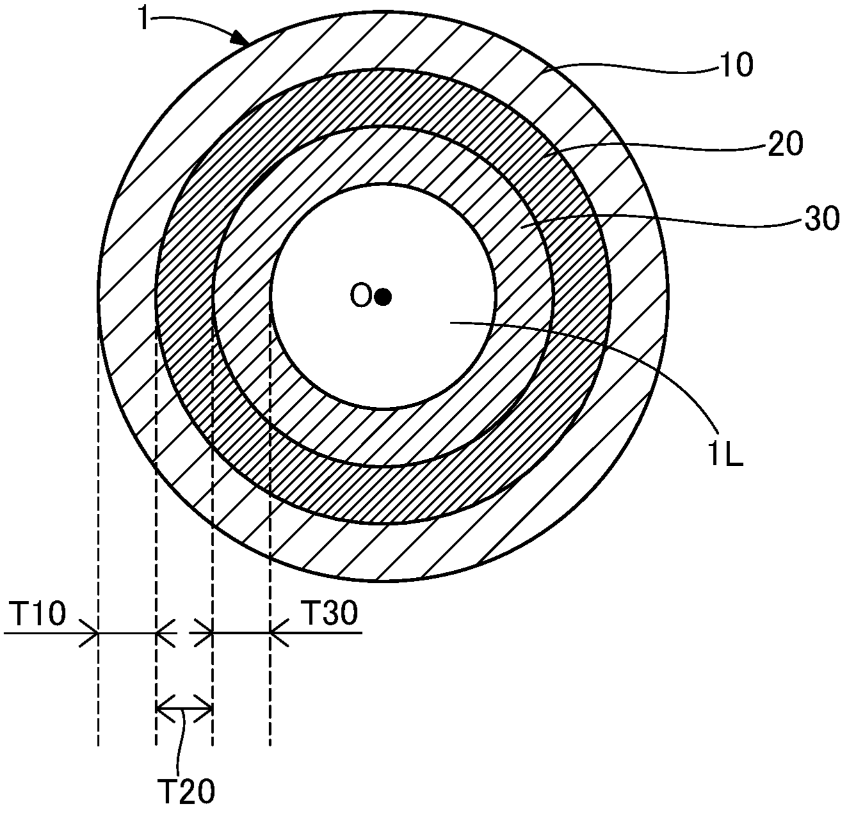
FIG. 3 is a transverse sectional view of the vascular model, taken along line A-A (FIG. 2).

FIG. 3 is a transverse sectional view of the vascular model 1, taken along line A-A (FIG. 2). The vascular model 1 includes a first tube body 10, a second tube body 20, and a third tube body 30.

The first tube body 10 is disposed on the outermost side of the vascular model 1 and simulates a tunica externa in a human blood vessel. The first tube body 10 has a hollow tubular shape, specifically an almost hollow cylindrical shape. The second tube body 20 is disposed on an inner side relative to the first tube body 10 and on an outer side relative to the third tube body 30 (in other words, between the first and third tube bodies 10 and 30) in the vascular model 1, and simulates a tunica media of a human blood vessel. Like the first tube body 10, the second tube body 20 has a hollow tubular shape, specifically an almost hollow cylindrical shape. The second tube body 20 covers the inner peripheral surface of the first tube body 10, and the inner peripheral surface of the first tube body 10 and the outer peripheral surface of the second tube body 20 are in contact with each other. The third tube body 30 is disposed on the innermost side of the vascular model 1 and simulates a tunica intima in a human blood vessel. Like the first tube body 10, the third tube body 30 has a hollow tubular shape, specifically an almost hollow cylindrical shape. The third tube body 30 covers the inner peripheral surface of the second tube body 20, and the inner peripheral surface of the second tube body 20 and the outer peripheral surface of the third tube body 30 are in contact with each other.

In the first embodiment, as illustrated in FIG. 3, a thickness T10 of the first tube body 10, a thickness T20 of the second tube body 20, and a thickness T30 of the third tube body 30 are equal to each other. However, the thicknesses T10, T20, and T30 may differ from each other. For example, the thickness T20 of the second tube body 20 corresponding to the tunica media may be made thicker than the thickness T10 of the first tube body 10 corresponding to the tunica externa and the thickness T30 of the third tube body 30 corresponding to the tunica intima, as in a real human blood vessel. Each thickness T10, T20, or T30 may be a thickness of any portion in any transverse section of each of the first to third tube bodies 10 to 30.

The first tube body 10, the second tube body 20, and the third tube body 30 are all made of a polymer material containing fine particles. All of the first to third tube bodies 10 to 30 according to the first embodiment include PVA as the polymer material. All of the first to third tube bodies 10 to 30 according to the first embodiment include polymer fine particles as the fine particles. In addition to the polymer fine particles, metal fine particles or glass fine particles may also be used as the fine particles. In addition to PVA, gelatin, urethane, silicone, or the like may be used as the polymer material.

Herein, a fine particle concentration A in the first tube body 10 is higher than a fine particle concentration B in the second tube body 20 and is higher than or equal to a fine particle concentration C in the third tube body 30 (A>B, A≥C). The fine particle concentration C in the third tube body 30 is higher than the fine particle concentration B in the second tube body 20 (C>B). In other words, the fine particle concentrations A, B, and C of the first to third tube bodies 10 to 30 are in the relationship of "fine particle concentration A≥fine particle concentration C>fine particle concentration B".

Preferably, the particle diameters of the fine particles contained in the first to third tube bodies 10 to 30 are all 0.1 μm or larger and 500 μm or smaller. More preferably, the particle diameters of the fine particles contained in the first to third tube bodies 10 to 30 are all in a range of 20 μm or larger and 100 μm or smaller. If the particle diameter is within the range of 20 μm or larger and 100 μm or smaller, the images of the first to third tube bodies 10 to 30 can further mimic an image of a real human blood vessel in the ultrasonic images acquired by the ultrasonic image diagnostic device. For example, in the case of the first tube body 10, it is possible to adopt an average particle diameter of a plurality of fine particles contained in a prescribed unit area, determined by heating the first tube body 10 to evaporate a PVA gel and then microscopically observing the first tube body 10. The particle diameters of the second tube body 20 and the third tube body 30 can also be determined in the same way as for the first tube body 10.

The acoustic impedance is a measurement of sound propagativity represented by a numerical value, which is determined by medium density×acoustic velocity. Herein, the polymer fine particles have a higher acoustic impedance than that of PVA. The fine particle concentrations A, B, and C of the first to third tube bodies 10 to 30 are in the relationship as described above. Consequently, an acoustic impedance A of the first tube body 10 is higher than an acoustic impedance B of the second tube body 20 and is higher than or equal to an acoustic impedance C of the third tube body 30 (A>B, A≥C). The acoustic impedance C of the third tube body 30 is higher than the acoustic impedance B of the second tube body 20 (C>B) In other words, the acoustic impedances A, B, and C of the first to third tube bodies 10 to 30 are in the relationship of "acoustic impedance A≥acoustic impedance C>acoustic impedance B".

The acoustic impedances of the first to third tube bodies 10 to 30 can be measured e.g. by a measurement device using a technique (surface impedance method) in which a sound absorption coefficient of a medium is determined by measuring a surface impedance (sound pressure/acoustic particle velocity) of the medium surface. The acoustic impedance is proportional to a reflection intensity. For this reason, an ultrasonic reflection intensity on each surface of the first to third tube bodies 10 to 30 is measured. The reflection intensities may be regarded as acoustic impedances of the first to third tube bodies 10 to 30.

Figure 4:
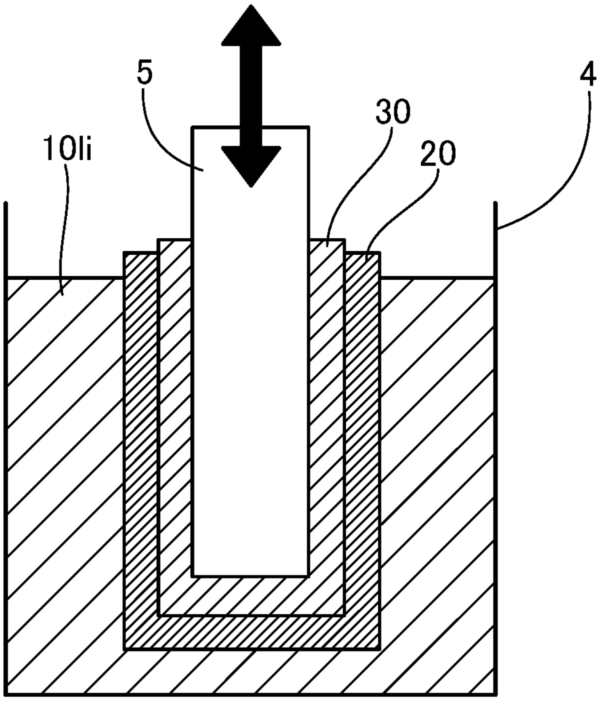
FIG. 4 is an explanatory diagram illustrating a step in a method for preparing the vascular model.

FIG. 4 is an explanatory diagram illustrating a step in a method for preparing the vascular model 1. The vascular model 1 can be prepared e.g. by a procedure of the following steps a1 to a7. Herein, FIG. 4 illustrates step a6.

(a1) Polymer fine particles of which the amount has been adjusted to the fine particle concentration C are dispersed in a PVA gel in container 4 to prepare a solution for the third tube body 30.

(a2) A hollow cylindrical core material 5 is soaked in the solution of step a1, and then taken out and dried to form the third tube body 30 on the periphery of the core material 5.

(a3) Polymer fine particles of which the amount has been adjusted to the fine particle concentration B are dispersed in a PVA gel in the container 4 to prepare a solution for the second tube body 20.

(a4) The core material 5 obtained in step a2 is soaked in the solution of step a3, and then taken out and dried to form the second tube body 20 on the periphery of the third tube body 30.

(a5) Polymer fine particles of which the amount has been adjusted to the fine particle concentration A are dispersed in a PVA gel in the container 4 to prepare a solution 101*i* for the first tube body 10.

(a6) The core material 5 obtained in step a4 is soaked in the solution of step a5, and then taken out and dried to form the first tube body 10 on the periphery of the second tube body 20.

(a7) The core material 5 is taken out, and both of its ends (top and bottom ends in FIG. 4) are cut to obtain the vascular model 1.

Figure 5A:
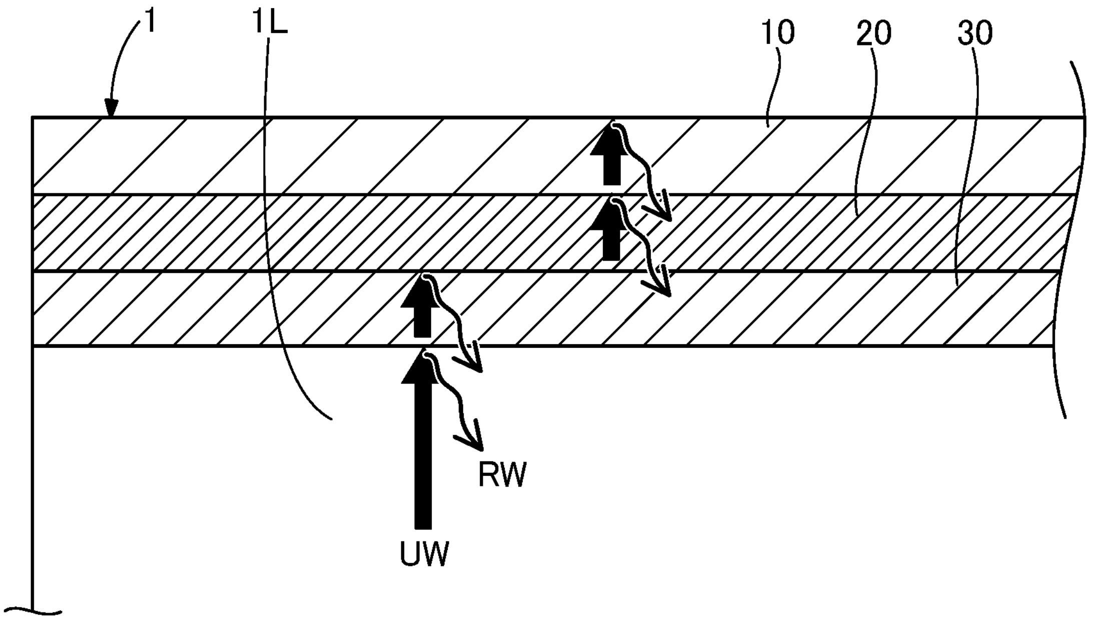
FIGS. 5A and 5B are explanatory diagrams illustrating an ultrasonic image acquired by an ultrasonic image diagnostic device.
Figure 5B:
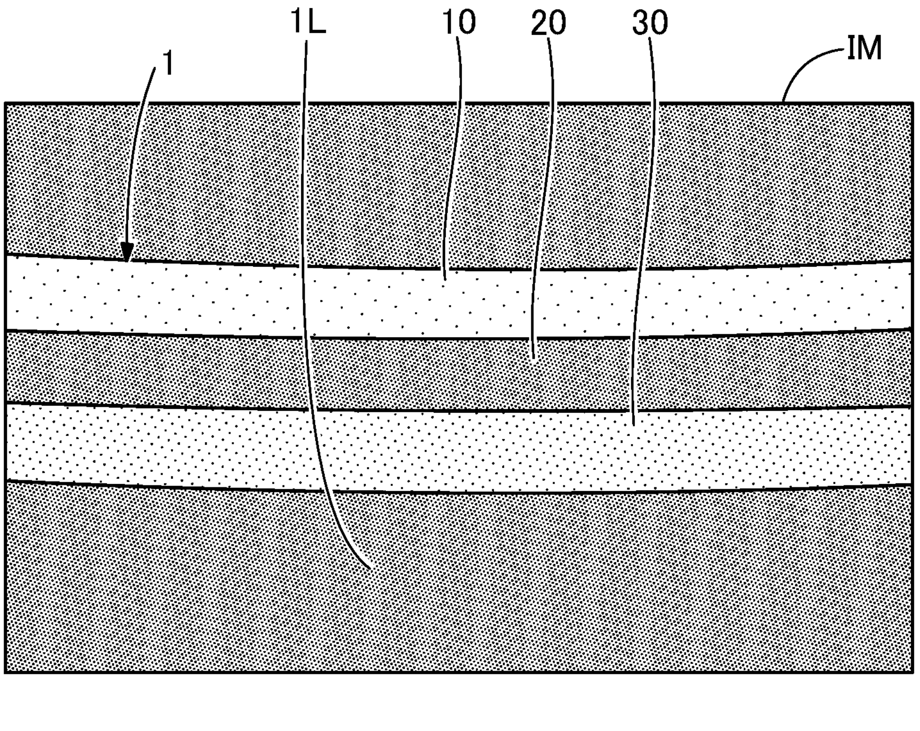

FIGS. 5A and 5B are an explanatory diagram illustrating an ultrasonic image acquired by the ultrasonic image diagnostic device. The ultrasonic image diagnostic device has an ultrasonic sensor that emits ultrasonic waves toward a living body tissue and receives the ultrasonic waves (reflected waves) that has propagated through the living body tissue and then reflected. The ultrasonic image diagnostic device generates a two-dimensional image (hereinafter, also referred to as "ultrasonic image") with light and shade gradation depending on the intensity of the received reflected waves. The ultrasonic sensor is also referred to as an ultrasonic probe, an ultrasonic transducer, a piezoelectric substance, an ultrasonic transmitting/receiving element, or an ultrasonic element. As the ultrasonic image diagnostic device, there are two types: a device that emits ultrasonic waves from an inside of an organism lumen toward a body surface to acquire an ultrasonic image, e.g. IntraVascular UltraSound (IVUS); and a device that emits ultrasonic waves from a body surface toward an inside of an organism lumen to acquire an ultrasonic image. FIG. 5A illustrates an ultrasonic wave UW emitted from an ultrasonic image diagnostic device e.g. IVUS, and a reflected wave RW from the vascular model 1.

Herein, the intensity of the reflected wave becomes higher on an interface where the acoustic impedance changes rapidly. The vascular model 1 according to the first embodiment has a configuration in which, as described above, the acoustic impedances A, B, and C of the first to third tube bodies 10 to 30 are in the relationship of "acoustic impedance A≥acoustic impedance C>acoustic impedance B", and the second tube body 20 is sandwiched between the first and third tube bodies 10 and 30 having relatively high acoustic impedances. Thus, as illustrated in FIG. 5A, in the case of the vascular model 1 according to the first embodiment, a relatively intensive reflected wave RW is generated on each of an interface between a lumen 1L and the third tube body 30, an interface between the third tube body 30 and the second tube body 20, an interface between the second tube body 20 and the first tube body 10, and an interface between the first tube body 10 and the outside.

FIG. 5B illustrates an example of an ultrasonic image IM. As a result of the intensive reflected wave RW generated on each interface of the vascular model 1 as described above, each of the first to third tube bodies 10 to 30 of the vascular model 1 appears in a layer shape on the ultrasonic image IM acquired by the ultrasonic image diagnostic device. In the ultrasonic image IM in FIG. 5B, the images of the first and third tube bodies 10 and 30 having relatively high acoustic impedances are more luminous (whiter) than the image of the second tube body 20.

As described above, the vascular model 1 according to the first embodiment includes the first tube body 10 and the second tube body 20, and the acoustic impedance A of the first tube body 10 is higher than the acoustic impedance B of the second tube body 20. Thus, as illustrated in FIG. 5B, the image of the first tube body 10 can be made more luminous (whiter) than the image of the second tube body 20 in the ultrasonic image IM acquired by the ultrasonic image diagnostic device. This makes it possible to provide the vascular model 1 in which the ultrasonic image IM mimics a real living body.

Since the vascular model 1 according to the first embodiment includes the hollow tubular third tube body 30 that covers the inner peripheral surface of the second tube body 20, the vascular model 1 can have a three-layer structure similar to that of a real human blood vessel. The acoustic impedance C of the third tube body 30 is lower than or equal to the acoustic impedance A of the first tube body 10 and higher than the acoustic impedance B of the second tube body 20. Thus, as illustrated in FIG. 5B, the image of the third tube body 30 can have a luminance lower (darker) than or equal to that of the image of the first tube body 10 in the ultrasonic image IM acquired by the ultrasonic image diagnostic device. Furthermore, the image of the third tube body 30 can be made more luminous (whiter) than that of the image of the second tube body 20. This makes it possible to provide the vascular model 1 in which the ultrasonic image IM further mimics a real living body.

Furthermore, in the vascular model 1 according to the first embodiment, when the fine particle concentration A in the first tube body 10 is higher than the fine particle concentration B in the second tube body 20, the acoustic impedance A of the first tube body 10 can be easily made higher than the acoustic impedance B of the second tube body 20. Since both the particle diameters of the fine particles in the first tube body 10 and the second tube body 20 are within the range of 0.1 μm or larger and 500 μm or smaller, the fine particles can be easily dispersed in the polymer material solution when preparing the first and second tube bodies.

Second Embodiment

Figure 6:
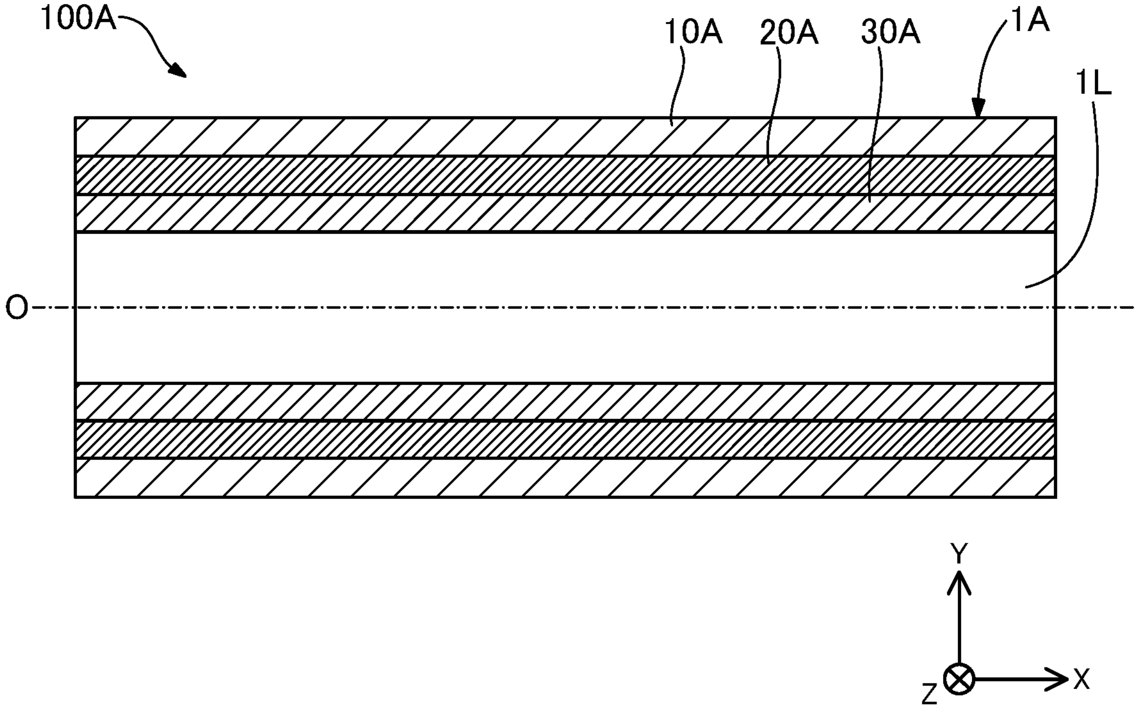
FIG. 6 is an explanatory diagram illustrating a sectional configuration of a vascular model according to the second embodiment.

FIG. 6 is an explanatory diagram illustrating a sectional configuration of a vascular model 1A according to the second embodiment. A vascular simulation device 100A according to the second embodiment includes the vascular model 1A instead of the vascular model 1. The vascular model 1A includes a first tube body 10A instead of the first tube body 10, a second tube body 20A instead of the second tube body 20, and a third tube body 30A instead of the third tube body 30 in the configuration described in the first embodiment.

The first to third tube bodies 10A to 30A have the same shapes and are arranged in the same manner as in the first embodiment, and are in the same intensity relationship among the acoustic impedances A to C as in the first embodiment "acoustic impedance A≥acoustic impedance C>acoustic impedance B". However, in the second embodiment, the intensity relationship is established by changing the acoustic impedances A to C of the first to third tube bodies 10A to 30A using a method different from the method described in the first embodiment.

FIG. 7 is a table presenting methods for changing the acoustic impedance, as examples. In the row "Example 1" of FIG. 7, methods described in the first embodiment (i.e. method for changing the acoustic impedances A to C by changing the fine particle concentrations A to C) are listed. In the second embodiment, the acoustic impedances A to C of the first to third tube bodies 10A to 30A are changed by any of the methods presented in the rows "Example 2", "Example 3", and "Example 4" to establish the above intensity relationship. The methods will be sequentially explained below.

In Example 2, the polymer materials constituting the first to third tube bodies 10A to 30A are changed. The first tube body 10A includes a polymer material A (e.g. PVA). The second tube body 20A includes a polymer material B (e.g. silicone). The third tube body 30A includes a polymer material C (e.g. PVA). As the polymer materials A, B, and C, any materials such as PVA, gelatin, urethane, and silicone can be used as long as the acoustic impedances of the materials are in the relationship of "polymer material A≥polymer material C>polymer material B". The acoustic impedances can be obtained by the same method as in the first embodiment. As presented in the table, the same material may be used for the polymer materials A and C. The first to third tube bodies 10A to 30A may or may not contain fine particles. When fine particles are contained, any fine particles such as polymer fine particles, metal fine particles, and glass fine particle can be used. The amounts of the fine particles contained in the first to third tube bodies 10A to 30A may be the same, or may be different from each other unless the intensity relationship among the acoustic impedances A to C is affected.

In Example 2, when the acoustic impedance of the polymer material A constituting the first tube body 10A is higher than the acoustic impedance of the polymer material B constituting the second tube body 20A, the acoustic impedance A of the first tube body 10A can be easily made higher than the acoustic impedance B of the second tube body 20A. The same applies to the third tube body 30A.

In Example 3, the hardness of the first to third tube bodies 10A to 30A is changed. Specifically, a relationship of "hardness A of the first tube body 10A≥hardness C of the third tube body 30A>hardness B of the second tube body 20A" is established. The hardness A, B, and C may be achieved by changing the types of the polymer materials constituting the first to third tube bodies 10A to 30A. Also, the hardness A, B, and C may be achieved by changing the concentrations of the polymer materials constituting the first to third tube bodies 10A to 30A. Furthermore, the hardness A, B, and C may also be achieved by adding an additive for changing the hardness to the polymer materials when preparing the first to third tube bodies 10A to 30A (FIG. 4). Note that the first to third tube bodies 10A to 30A may or may not contain any fine particles.

In Example 3, when the hardness A of the first tube body 10A is higher than the hardness B of the second tube body 20A, the acoustic impedance A of the first tube body can be easily made higher than the acoustic impedance B of the second tube body A. The same applies to the third tube body 30A.

In Example 4, the types of the fine particles contained in the first to third tube bodies 10A to 30A are changed. The first tube body 10A includes fine particles A (e.g. metal fine particles). The second tube body 20A includes fine particles B (e.g. polymer fine particles). The third tube body 30A includes fine particles C (e.g. glass fine particles). As the fine particles A, B, and C, any fine particles such as polymer fine particles, metal fine particles, and glass fine particles can be used as long as the hardness of the fine particles is in the relationship of "fine particle A≥fine particle C>fine particle B". If the fine particles A to C are each a single type of particulate, catalogue values can be used as the hardness of the fine particles A to C. For example, if the fine particles A are composed of multiple types of fine particles, the hardness of the fine particles A can be expressed by an average value of the hardness of the plurality of fine particles contained in a prescribed unit area. Any materials such as PVA, gelatin, urethane, and silicone can be used as the main polymer materials for the first to third tube bodies 10A to 30A. The first to third tube bodies 10A to 30A may be made of a same polymer material or different polymer materials unless the intensity relationship among the acoustic impedances A to C is affected.

In Example 4, when the fine particles A contained in the first tube body 10A have a hardness higher than that of the fine particles B contained in the second tube body 20A, the acoustic impedance A of the first tube body 10A can be easily made higher than the acoustic impedance B of the second tube body 20A. The same applies to the third tube body 30A.

In this way, the acoustic impedances A to C of the first to third tube bodies 10A to 30A may be changed using a method different from that described in the first embodiment. Although the methods of changing the acoustic impedances A to C were described as examples in Examples 2 to 4, it is also possible to change the acoustic impedances A to C of the first to third tube bodies 10A to 30A by methods other than the aforementioned methods. This vascular model 1A according to the second embodiment can also exhibit the same effects as in the first embodiment described above.

Third Embodiment

Figure 8:
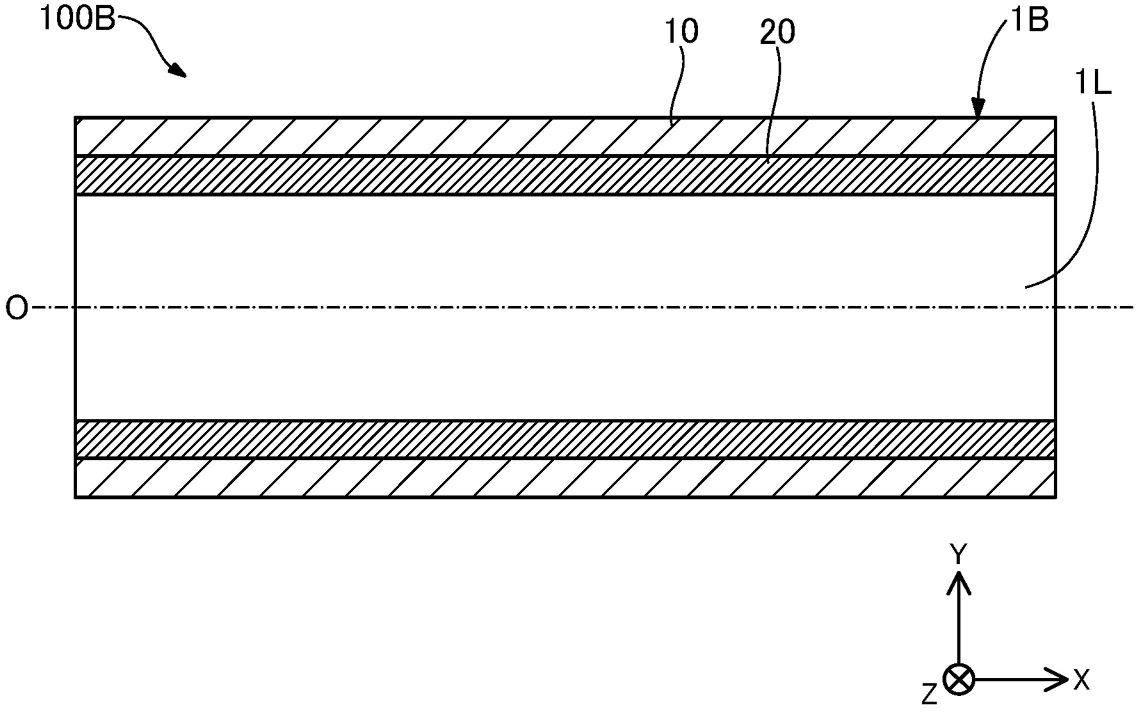
FIG. 8 is an explanatory diagram illustrating a sectional configuration of a vascular model according to the third embodiment.

FIG. 8 is an explanatory diagram illustrating a sectional configuration of a vascular model 1B according to the third embodiment. A vascular simulation device 100B according to the third embodiment includes the vascular model 1B instead of the vascular model 1. The vascular model 1B does not have the third tube body 30 in the configuration described in the first embodiment. Thus, the vascular model 1B may have a two-layer structure with the first tube body 10 corresponding to the tunica externa and the second tube body 20 corresponding to the tunica media. This vascular model 1B according to the third embodiment can also exhibit the same effects as in the first embodiment described above.

Fourth Embodiment

Figure 9:
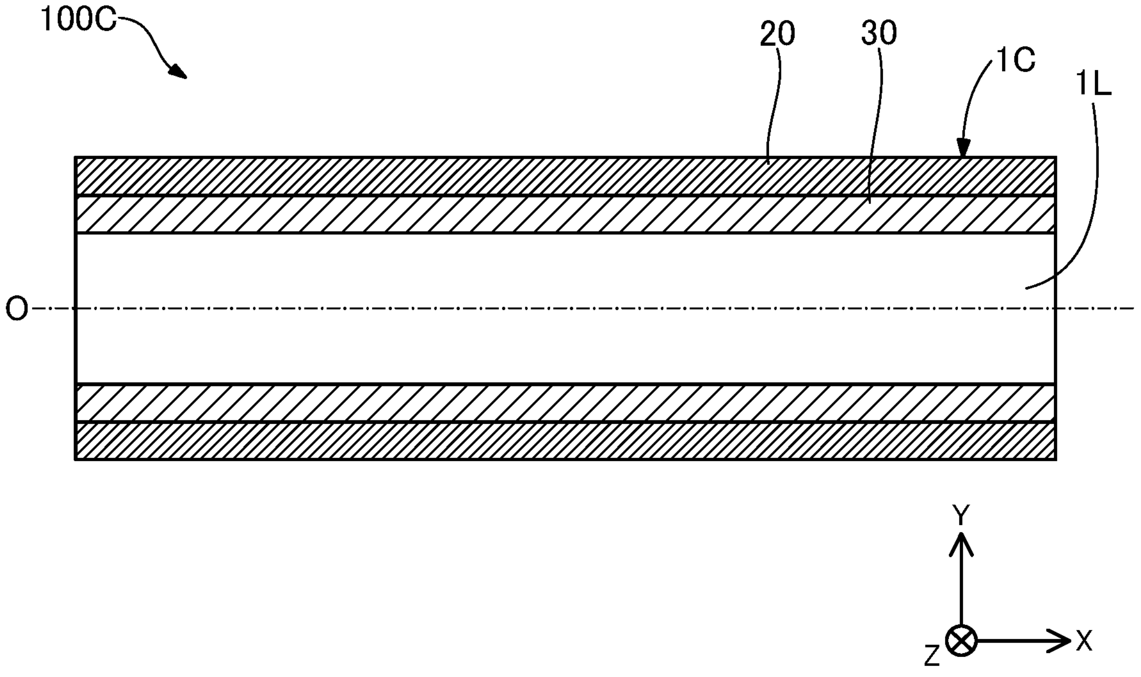
FIG. 9 is an explanatory diagram illustrating a sectional configuration of a vascular model according to the fourth embodiment.

FIG. 9 is an explanatory diagram illustrating a sectional configuration of a vascular model 1C according to the fourth embodiment. A vascular simulation device 100C according to the fourth embodiment includes the vascular model 1C instead of the vascular model 1. The vascular model 1C does not have the first tube body 10 in the configuration described in the first embodiment. Thus, the vascular model 1C may have a two-layer structure with the second tube body 20 corresponding to the tunica media and the third tube body 30 corresponding to the tunica intima. This vascular model 1C according to the fourth embodiment can also exhibit the same effects as in the first embodiment described above.

Fifth Embodiment

Figure 10:
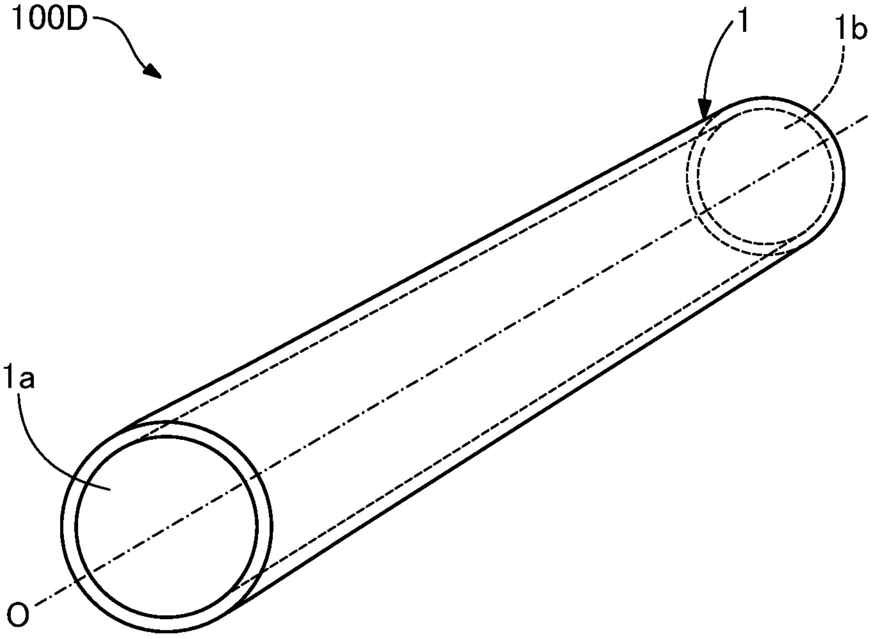
FIG. 10 is an explanatory diagram illustrating a schematic configuration of a vascular simulation device according to the fifth embodiment.

FIG. 10 is an explanatory diagram illustrating a schematic configuration of a vascular simulation device 100D according to the fifth embodiment. The vascular simulation device 100D does not include the outer tissue model 3 and the circulating pump 9 in the configuration described in the first embodiment. A vascular model 1 of the vascular simulation device 100D may be used after being wetted by a fluid (e.g. simulating blood such as physiological saline) or may be used in a dry state. The vascular simulation device 100D may include e.g. a water tank that can be filled with a fluid thereinside, and the vascular model 1 may be used while placed inside the water tank filled with the fluid. This vascular simulation device 100D according to the fifth embodiment can also exhibit the same effects as in the first embodiment described above.

Modifications of Embodiments

The disclosed embodiments are not limited to the embodiments described above and can be implemented in various aspects without departing from the spirit thereof, and, for example, the following modifications are also possible.

Modification Example 1

In the first to fifth embodiments, examples of the configurations of the vascular simulation devices 100 and 100A to 100D have been described. However, the configuration of the vascular simulation device 100 can be variously modified. For example, the vascular simulation device 100 may have an organ model that simulates an organ such as heart, liver, and brain. In this case, the vascular model 1 may be disposed outside or inside the organ model. For example, the vascular simulation device 100 may include a pulsation pump that gives a pulsation-simulating motion to the fluid circulated by the circulating pump 9. Examples of the pulsation pump include a positive displacement type reciprocating pump and a low-speed rotary pump.

Modification Example 2

In the first to fifth embodiments, examples of the configurations of the vascular models 1 and 1A to 1C have been described. However, the configuration of the vascular model 1 can be variously modified. For example, a blood vessel portion 10 may have any shape such as a straight shape, a curved shape, and a serpiginous shape. For example, the blood vessel portion 10 may be coated with a hydrophilic or hydrophobic resin. For example, the lumen 1L of the vascular model 1 may have a lesion portion that simulates a human lesion.

Modification Example 3

The configurations of the vascular simulation devices 100 and 100A to 100D or the vascular models 1 and 1A to 1C according to the first to fifth embodiments, and the configurations of the vascular simulation devices 100 and 100A to 100D or vascular models 1 and 1A to 1C according to the modification examples 1 and 2 may be combined as appropriate. For example, the vascular model 1 described in any of the first to third embodiments may be used in the vascular simulation device 100 according to the fifth embodiment.

The aspects of the disclosed embodiments have been described above on the basis of the embodiments and modification examples, however, the embodiments of the aspects described above are intended to facilitate understanding of the aspects, and are not intended to limit the aspects. The aspects can be modified and improved without departing from the spirit of the aspects and the scope of claims, and include equivalent aspects. Furthermore, the technical features may be omitted as appropriate unless they are described as essential in this specification.

DESCRIPTION OF REFERENCE NUMERALS

1, 1A to 1C . . . Vascular model
1L . . . Lumen
1*a* . . . Opening
1*b* . . . Opening
3 . . . Outer tissue model
4 . . . Container
5 . . . Core material
9 . . . Circulating pump
10, 10A . . . First tube body
20, 20A . . . Second tube body
30, 30A . . . Third tube body
100, 100A to 100D . . . Vascular simulation device

What is claimed is:

1. A vascular model, comprising:
a first tube body; and
a second tube body that covers an inner peripheral surface of the first tube body; and
a third tube body that covers an inner peripheral surface of the second tube body,
wherein the first tube body has an acoustic impedance that is higher than an acoustic impedance of the second tube body, and
the third tube body has an acoustic impedance that is lower than or equal to the acoustic impedance of the first tube body and higher than the acoustic impedance of the second tube body.

2. The vascular model according to claim 1, wherein:
each of the first tube body and the second tube body comprises:
a polymer material, and
fine particles having an acoustic impedance that is higher than an acoustic impedance of the polymer material, and
a fine particle concentration in the first tube body is higher than a fine particle concentration in the second tube body.

3. The vascular model according to claim 2, wherein particle diameters of the fine particles contained in the first tube body and particle diameters of the fine particles contained in the second tube body are within a range of 0.1 μm or larger and 500 μm or smaller.

4. The vascular model according to claim 3, wherein
the polymer material constituting the first tube body has an acoustic impedance that is higher than an acoustic impedance of the polymer material constituting the second tube body.

5. The vascular model according to claim 3, wherein
the first tube body has a hardness that is higher than a hardness of the second tube body.

6. The vascular model according to claim 2, wherein:
a type of the fine particles contained in the first tube body differs from a type of the fine particles contained in the second tube body, and
the fine particles contained in the first tube body have a hardness that is higher than a hardness of the fine particles contained in the second tube body.

7. The vascular model according to claim 6, wherein
particle diameters of the fine particles contained in the first tube body and particle diameters of the fine particles contained in the second tube body are within a range of 0.1 μm or larger and 500 μm or smaller.

8. The vascular model according to claim 2, wherein
the polymer material constituting the first tube body has an acoustic impedance that is higher than an acoustic impedance of the polymer material constituting the second tube body.

9. The vascular model according to claim 2, wherein
the first tube body has a hardness that is higher than a hardness of the second tube body.

10. The vascular model according to claim 1, wherein:
each of the first tube body and the second tube body comprises:
a polymer material, and
fine particles having an acoustic impedance higher than an acoustic impedance of the polymer material,
a type of the fine particles contained in the first tube body differs from a type of the fine particles contained in the second tube body, and
the fine particles contained in the first tube body have a hardness that is higher than a hardness of the fine particles contained in the second tube body.

11. The vascular model according to claim 10, wherein
the polymer material constituting the first tube body has an acoustic impedance that is higher than an acoustic impedance of the polymer material constituting the second tube body.

12. The vascular model according to claim 10, wherein the first tube body has a hardness that is higher than a hardness of the second tube body.

13. The vascular model according to claim 10, wherein:
a type of the fine particles contained in the third tube body differs from a type of the fine particles contained in the first tube body and differs from a type of the fine particles contained in the second tube body, and
a hardness of the fine particles contained in the third tube body is lower than or equal to a hardness of the fine particles contained in the first tube body and higher than a hardness of the fine particles contained in the second tube body.

14. The vascular model according to claim 1, wherein:
each of the first tube body and the second tube body is made of a polymer material, and
the polymer material constituting the first tube body has an acoustic impedance that is higher than an acoustic impedance of the polymer material constituting the second tube body.

15. The vascular model according to claim 14, wherein the first tube body has a hardness that is higher than a hardness of the second tube body.

16. The vascular model according to claim 1, wherein
each of the first tube body and the second tube body is made of a polymer material, and
the first tube body has a hardness that is higher than a hardness of the second tube body.

17. The vascular model according to claim 1, wherein particle diameters of the fine particles contained in the first tube body and particle diameters of the fine particles contained in the second tube body are within a range of 20 μm or larger and 100 μm or smaller.

18. The vascular model according to claim 1, wherein the first, second, and third tube bodies comprise one or more polymer materials.

19. The vascular model according to claim 18, wherein:
the first tube body comprises a polymer material A,
the second tube body comprises a polymer material B, and
the third tube body comprises a polymer material C, wherein
the acoustic impedance of polymer material A is greater than or equal to the acoustic impedance of polymer material C, and
the acoustic impedance of polymer material C is greater than the acoustic impedance of polymer material B.

* * * * *